Feb. 3, 1942.   C. E. COCHRAN   2,271,624
LOAD HANDLING MECHANISM FOR INDUSTRIAL TRUCKS
Filed May 26, 1939   4 Sheets-Sheet 4

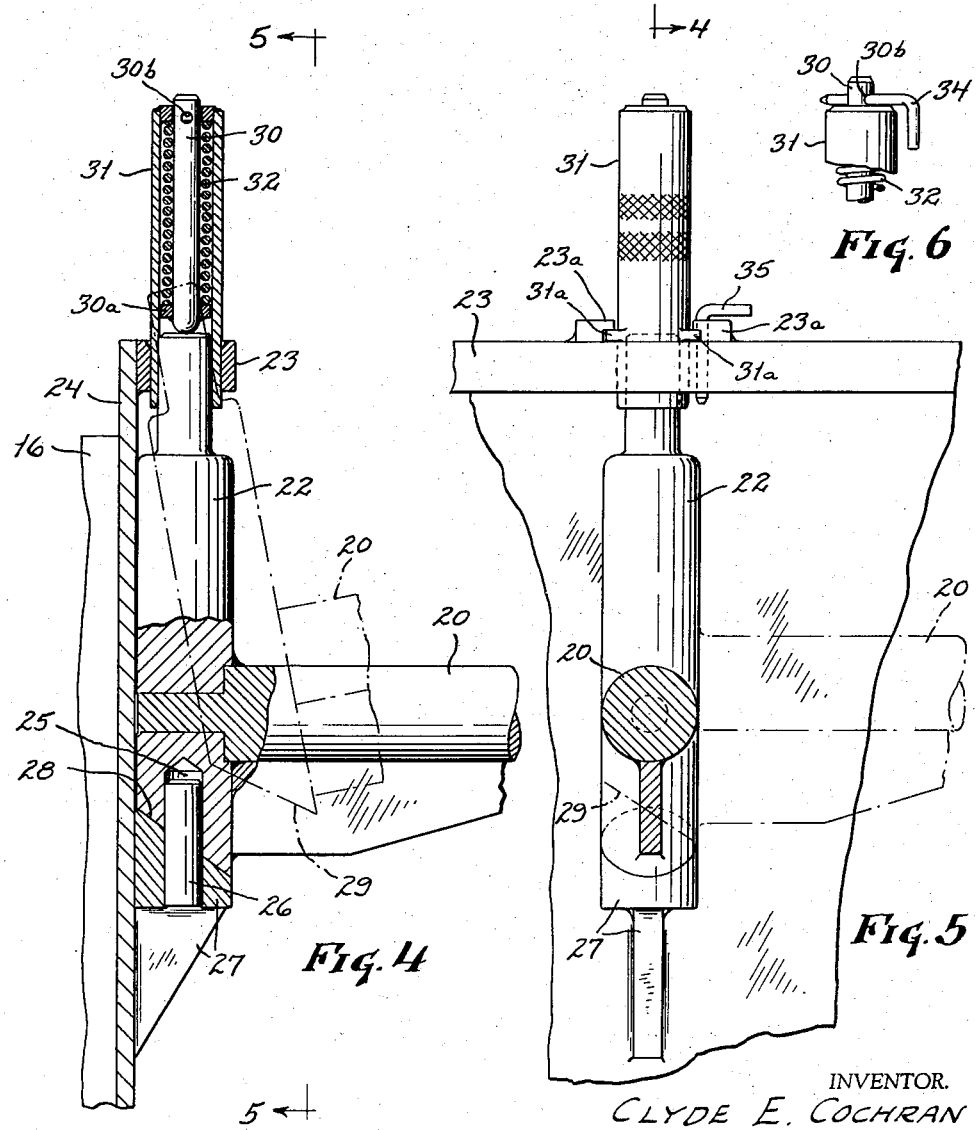

INVENTOR.
CLYDE E. COCHRAN
BY Bates, Golrick, & Teare
ATTORNEYS

Patented Feb. 3, 1942

2,271,624

UNITED STATES PATENT OFFICE 2,271,624

LOAD HANDLING MECHANISM FOR INDUSTRIAL TRUCKS

Clyde E. Cochran, Cleveland, Ohio, assignor to The Elwell-Parker Electric Company, Cleveland, Ohio, a corporation of Ohio Application May 26, 1939, Serial No. 275,883

15 Claims. (Cl. 214—112)

This invention is concerned with improvements in load-handling trucks of the industrial type, and has for its general object the provision of an improved load-engaging elevating and carrying mechanism particularly adaptable to the handling of loads comprising products of considerable bulk and which will be utilizable in confined spaces.

A more specific object of the present invention is the provision of an improved load-handling mechanism for industrial trucks of the tier-lift type, having a novel arrangement of parts permitting the efficient and safe handling of hollow loads in confined spaces.

A further object of the present invention is the provision of a load-handling mechanism of the type which operatively overhangs or projects from the end of an industrial truck and which is adapted to support and handle loads carried by the truck in such manner as to increase the maneuverability of the truck in confined spaces, such as narrow warehouse aisles, factory aisles, railroad cars, etc.

A still further object of the present invention is the provision of a self-centering laterally swingable load-handling device which may be readily removed from a load elevating mechanism of an industrial truck.

Other objects of the present invention will become apparent from the following description which refers to the accompanying drawings. The drawings illustrate two embodiments of the invention and the essential characteristics thereof are summarized in the claims.

Figure 2:
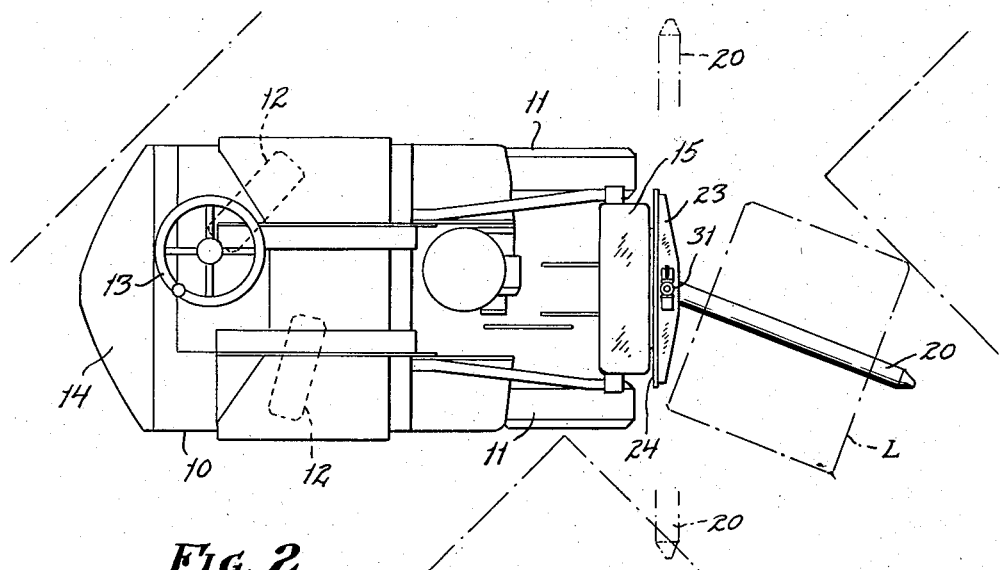
Figure 1:
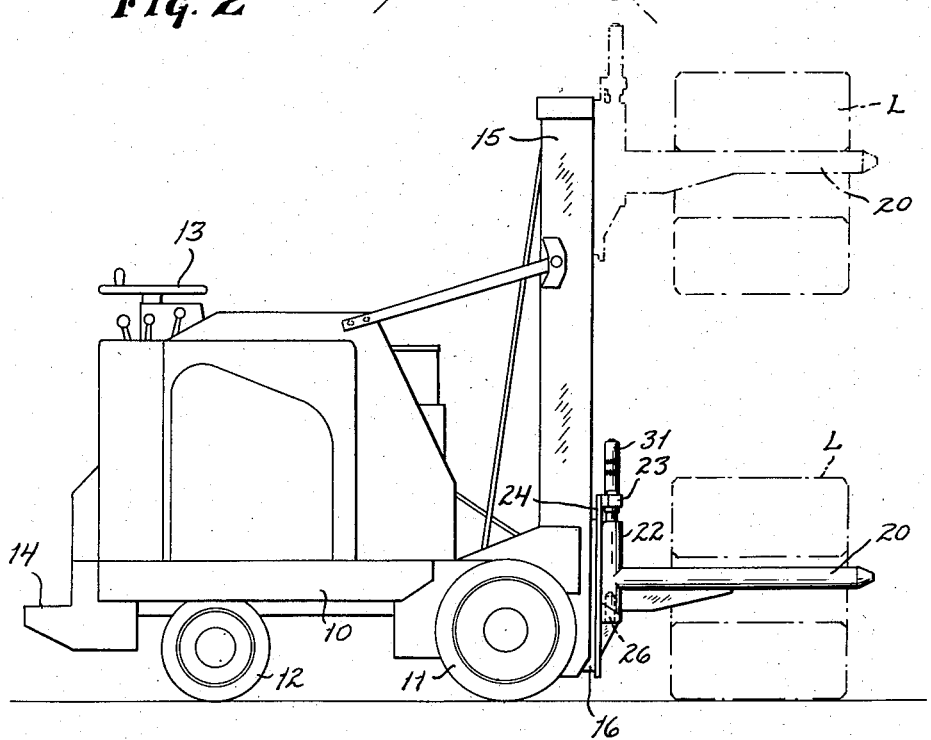
Figure 7:
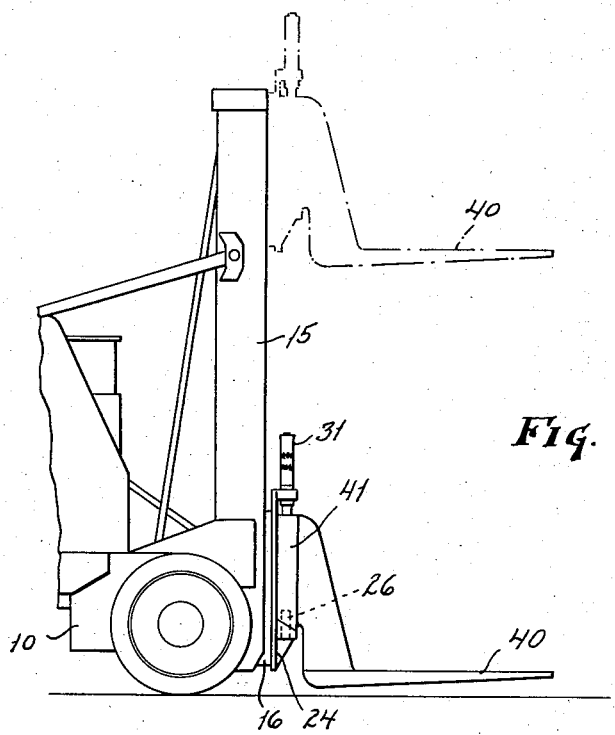
Figure 8:
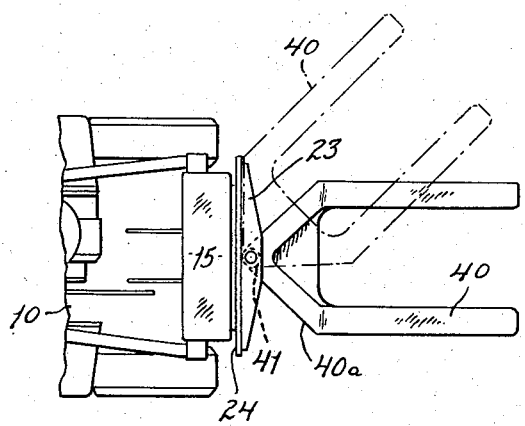
Figure 9:
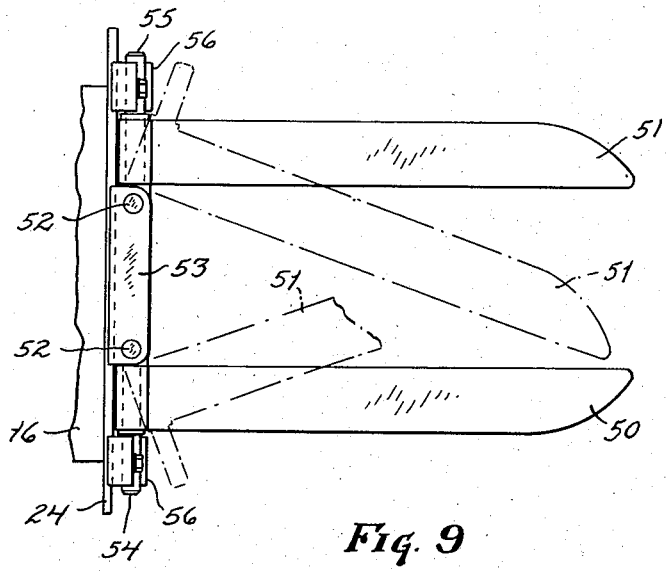
Figures 10, 11:
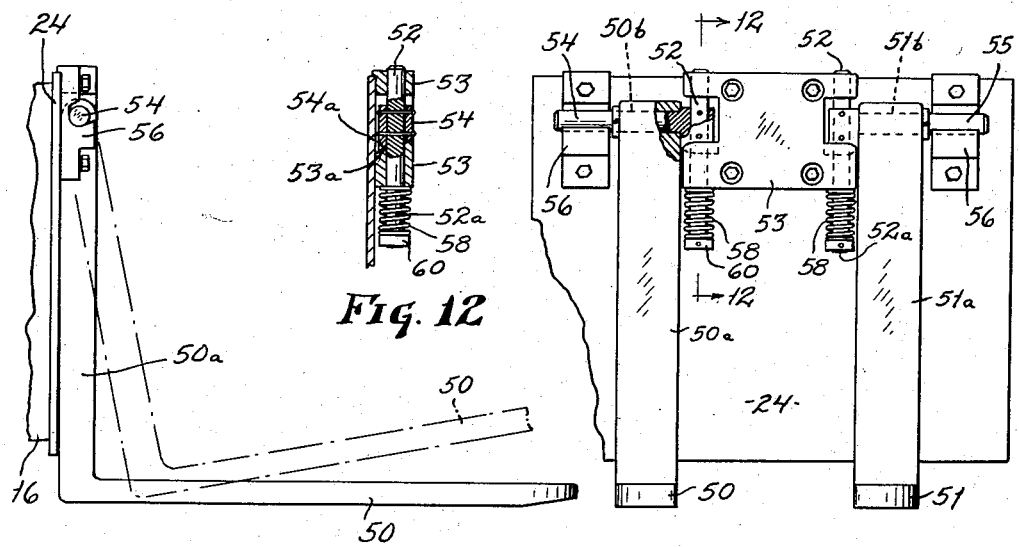

In the drawings, Fig. 1 is a side elevation of an industrial truck of the tier-lift type, illustrating one embodiment of my invention adapted for use with such trucks; Fig. 2 is a plan view of the truck and attached mechanism illustrated in Fig. 1; Fig. 3 is an enlarged fragmentary view of parts of the elements comprising the load-engaging and handling mechanism; Fig. 4 is an enlarged cross-sectional view of the load-handling mechanism taken substantially along the line 4—4 of Fig. 3; Fig. 5 is a front elevational view, taken substantially along the line 5—5 of Fig. 4; Fig. 6 is a fragmentary elevational view of part of the load-handling mechanism; Figs. 7 and 8 illustrate a modified form of the invention adapted to the handling of a load, the physical bulk characteristics of which are different than the products handled by the load-handling mechanism illustrated in Figs. 1 to 6, inclusive, and Figs. 9, 10, 11 and 12 illustrate a modification of the device shown in Figs. 7 and 8.

In industrial trucks of the type referred to, various load-handling means have been devised as attachments to the carriage of a tier-lift truck, including so-called "ram" types of load-handling means and fork type load-handling means. In the ram type a rigid bar or ram member is attached usually to the load-elevating mechanism, whereby the truck can be maneuvered to have the bar engage in the hollow of a bulk load, such as a plurality of automobile tires, bundles of steel rods or wire, strip steel rolls, cable spools, rolls of newspapers, and other bulk loads which are hollow. In the fork type outwardly extending members are attached to the elevating mechanism and are adapted to engage beneath the load.

While such arrangements of overhanging rams and fork devices can be utilized on an industrial truck in a convenient and efficient manner where truck maneuvering space is available, nevertheless I have found that where traction space for trucking use is limited, such load-handling devices are limited in the utility thereof, due to the overall length of the load-handling device and the truck frame. By the use of the present invention, as adapted to load-engaging devices of the so-called ram type, and other load-engaging devices of the truck frame overhanging type, such as the overhanging lift forks, I am able to utilize an industrial truck of standard dimensions in confined spaces.

By providing an articulated connection between the load elevator mechanism of the truck and the load-engaging or handling device, it is practical to bring about a relative movement between the truck frame and the load, which permits the close depositing, stacking or tiering of the load where only a limited amount of traction or aisle space is available for maneuvering the truck.

Referring to the drawings, in Fig. 1 I show by way of one adaptation of my invention, a tier-lift truck having a chassis or frame 10 mounted upon forwardly disposed non-dirigible wheels 11 and rearwardly disposed dirigible wheels 12. The dirigible wheels 12 are adapted to be steered by a steering wheel 13, by an operator standing upon the operator's platform 14 of the truck. The driving means for the truck wheels, the steering mechanism, etc. are omitted from the drawings, inasmuch as these mechanisms form no part of the present invention. The power means can comprise the usual storage battery and motor with reduction gearing connected to the driven wheels, or the truck may be gas-engined powered, as will be evident to those skilled in the art.

At the forward end of the truck frame 10 I show on upright frame 15, which may comprise the usual vertically extending guide members for operatively supporting a load elevator mechanism 16 in a well known manner, the means for raising and lowering the elevator mechanism being illustrated only in a general way. In Figs. 1 to 6, inclusive, of the drawings, I show a load-engaging ram or bar 20, with means associated therewith for connecting the bar 20 to the elevator mechanism 16 in an articulated manner, whereby the truck can be maneuvered to either the right or to the left of a longitudinally aligned position relative to the bar 20, as illustrated in Fig. 2. The bar 20, or the load supported and carried thereby, during such maneuvering, will abut or react against a column, wall, or stacks of adjacent merchandise, whereby the load remains substantially relatively stationary, while the truck is being thus maneuvered.

The connecting means between the load-engaging device or bar 20 and the elevator mechanism may comprise a pivot bar or trunnion 22, to which the load-engaging bar is suitably rigidly secured. The pivot bar 22 is supported at the top thereof by a pivot bearing 23, secured to a mounting plate 24, the plate 24 being carried by the load elevator mechanism 16. The lower end of the pivot bar 22 is provided with a bore 25, into which extends a pivot pin 26, which is removably mounted in a supporting bracket 27 secured to the mounting plate 24.

To maintain the load-engaging ram 20 in a longitudinally aligned or centered relationship to the truck frame, I form the upper face 28 of the lower bracket 27 in such manner as to comprise a cam surface and the lower end of the pivot bar 22 is shaped to have a complementary cam surface 29 engaging the stationary cam surface 28 of the bracket member 27, whereby the weight of the bar 20 and pivot or trunnion bar 22 will cause the bar 20 to align longitudinally with the truck frame, by reason of the camming action which takes place between the surfaces 28 and 29. I have found it desirable to provide means which will act downwardly upon the pivot bar 22, to bring about a more definite aligning action of the cam surfaces 28 and 29, upon the pivot bar 22, and this means may comprise a plunger member 30, carried by a casing 31, which is adapted to be removably supported by the upper bearing member 23. A spring member 32 is disposed within the casing 31 in compressed condition between the upper end wall of the casing member 31 and a shoulder 30a formed upon the plunger member adjacent the lower end of the plunger member. Thus, the spring member 32 urges the lower end of the plunger member 30 into forcible contact with the upper end of the pivot bar 22, whenever the camming surfaces 28 and 29 are not in full contact, i. e. whenever the load-engaging bar 20 is not centered or aligned with the truck frame. During such a non-aligned condition of the bar 20, the trunnion bar 22 is rigid against the lower end of the plunger 30.

In the particular articulating means shown in detail in Figs. 3 to 6, inclusive, the elements thereof are so formed that the pivot bar 22 may be removed readily from the mounting plate 24. By providing means for holding the plunger 30 in an upward spring-retaining position, as illustrated in Fig. 6, the spring can be compressed when desired, by swinging the bar 20 out of truck frame alignment, thus causing the upper end of the plunger 30 to protrude to a greater extent than normally, whereby means can engage the plunger to maintain it in such an extended position. Accordingly, the plunger is provided with a transverse opening 30b, which is disposed exteriorly of the end of the casing 31, when the bar 20 is swung out of normal position, and this opening is adapted to receive a retaining pin 34 (see Fig. 6). The lower end of the casing is provided with two quadrant sections 31a (see Fig. 3) which are adapted to engage beneath bracket portions 23a, formed upon the upper side of the bearing bracket member 23, and one of the quadrants 31a is provided with a notch for engagement with a vertically extending removable pin 35, which passes through one of the bracket members 23a and into the bearing 23, to maintain the casing member 31 in the operative position illustrated in Figs. 3, 4 and 5. When it is desired to remove the load-engaging ram 20 and pivot bar 22, the plunger is positioned as above stated and the casing 31 is removed from engagement with the bracket 23. Removal of the sleeve 31 from engagement with the upper end of the pivot bar 22 leaves considerable play between the bearing 23 and the upper end of the pivot bar, whereby the ram 20 and pivot bar may be lifted upwardly and out of engagement with the lower pivot pin 26, as indicated by the dot and dash position in Fig. 4, whereupon the ram and pivot bar 22 may then be lowered out of engagement with the load elevator mechanism, thus permitting attachment of any other desired load-handling mechanism to the elevator mechanism.

In Figs. 7 and 8 of the drawings I show a modification of the load-engaging device illustrated in Figs. 1 to 6, inclusive, in that the load-engaging device may comprise a forked member 40 which may be attached to the pivot bar 41, or if desired, may be integrally formed therewith. The pivot bar 41 is adapted to be brought into cooperative relationship with the load elevator mechanism, as has been described. The means for aligning the load-engaging fork 40 longitudinally of the truck frame, and like parts of the modification may be the same as the elements, as set forth in Figs. 1 to 6, inclusive. It will be noted in Fig. 8 that the rear end 40a of the load-engaging fork 40 extends outwardly from the center of the pivot bar 41, whereby the load-engaging device comprising the fork 40 may be swung to the right or left of the longitudinal center of the truck for the purposes hereinbefore referred to, the only difference between the modification shown in Figs. 7 and 8 and the mechanism supporting the load-engaging ram 20 being that the fork members 40 are adapted to extend beneath the load or skid carrying a load rather than through a hollow of a bulk load.

In Figs. 9, 10, 11 and 12 I show a modification of the pivotally carried load-engaging fork mechanism shown in Figs. 7 and 8, in that each of the fork members 50 and 51 may have separate vertical pivot mountings so that either one of the fork members 50 or 51 may be swung toward the longitudinal center of the truck in a lateral direction. The mountings may also be such that either of the fork members may also swing upwardly, should an obstruction be encountered by either fork member during a lowering movement of the elevator mechanism. Hence, the fork members may be L-shaped with the pivotal mounting means therefor located adjacent the tops of vertically extending portions 50a and 51a thereof. Such mountings may comprise vertical trunnions 52 carried by a bearing or hinge block 53 secured to the mounting plate 24 of the elevator mechanism 16. The trunnions 52 extend through enlarged ends of horizontally extending hinge bars 54 and 55 and which bars extend through suitable bearing openings 50b and 51b formed in the upper ends of the fork members. The horizontal hinge bars 54 and 55 extend a sufficient distance through the fork members to engage in open bearing members 56. Thus, during normal use of the load-engaging forks, the load reaction is against the mounting plate 24 and upon the hinge block 53 and bearing members 56. If an obstruction is met by the fork members or either of them, they may swing about a horizontal axis as indicated by the dot and dash lines in Fig. 10. If a lateral obstruction is encountered by either the load or the fork members maneuvering of the truck will result in either one of the lateral displacements of the respective fork members, as indicated by the dot and dash lines in Fig. 9.

If desired, springs 58 may be attached to extensions 52a of the trunnions 52 and the other end of the springs may react against collars 60 on extensions 52a to cause cam surfaces 53a and 54a, respectively, formed on members 53 and 54 to maintain the vertically extending portions of the fork members in abutting relation to the face of the mounting plate 24.

It frequently happens that when a truck is carrying loads of the character referred to, it is possible to maneuver the truck and load to the desired depositing position, but after the load is deposited, the dirigible wheels of the truck are swung to such a position at the time of load depositing, that the truck cannot be retracted from the load, due to the fact that the truck cannot back away from the deposited load, except by a movement which is in a direction longitudinally to the load. With the present invention such a condition can be met readily for withdrawal of the truck need not be confined to such a longitudinal direction. Various other maneuvering advantages in position, loading, unloading and handling such an equipped truck with or without a load will be obvious to an industrial truck operator.

From the foregoing description of my invention it will be apparent that the overall length of a truck with an overhanging load supported upon a load elevator mechanism disposed at one end of the truck frame, can be considerably decreased when it is desired to utilize such a load-engaging device on an industrial truck in confined traction or truck maneuvering spaces, and it is to be understood that the invention is adaptable for use upon industrial trucks having an elevator mechanism incorporated therein other than industrial trucks of the tier-lift type.

I claim:

1. In an industrial truck, the combination of a truck frame and a longitudinally fixed load elevating mechanism attached to the truck frame adjacent one end thereof, of a load elevating means operated from the truck vertically movable on such frame, a load-engaging means carried by said mechanism normally in alignment with the longitudinal center of the truck and comprising a member for engaging hollow or ring shaped bodies projecting forwardly from the elevating mechanism, said load engaging means being pivotally movable to a position laterally of said normal alignment position, and means acting independently of gravity for assisting the return of said load engaging means to said normal position.

2. In an industrial truck, the combination of a truck frame, a longitudinally fixed load elevating mechanism attached to the truck frame adjacent one end thereof and including a load elevating mechanism movably supported on said frame, a load engaging means carried by said mechanism comprising a ram member projecting forwardly from substantially the center of the elevating mechanism and pivotally swingable about a vertical axis on the load elevating means, positive centering means on the elevating mechanism for yieldingly urging the ram to a position in which it is longitudinally aligned with the truck frame.

3. The combination of an elevating mechanism supported by a relatively non-swingable guideway mounted upon a truck frame and a load-engaging device pivotally carried by the elevating means and including articulating means operatively disposed between the elevating mechanism and the load-engaging device for permitting the load-engaging device to be angularly swung in a horizontal plane relative to the elevating mechanism and a wedge cam mechanism acting upon the load-engaging device for returning the same along its horizontal path of swing and yieldingly maintaining the said device in longitudinal alignment with the truck frame.

4. In an industrial truck, the combination of a main frame, a longitudinally fixed upright guide frame arranged upon the main frame, an elevator mechanism mounted to reciprocate upon the upright frame, a load-engaging device adapted to be brought into engagement with a load by a forward movement of the truck, pivot means connecting the load-engaging device to the elevator mechanism in an articulated manner thereby to permit relative lateral angular movement between the load-engaging device and the guide frame and including vertically active means other than gravity for returning the load-engaging device along its lateral path of movement and normally maintaining the load-engaging device in a longitudinally aligned relationship to the truck frame.

5. In an industrial truck, the combination of a truck frame, dirigible wheels for supporting the frame, a load elevator mechanism mounted upon the frame, load-engaging means carried by the load elevator mechanism in overhanging relation to one end of the frame of the truck, connecting means joining the load-engaging device to the elevator mechanism and adapted to permit a relative lateral swinging movement between the elevator mechanism and the load-engaging device and a load carried by said device and including pivotal means having an associated cam mechanism for returning the load-engaging device along its lateral path of swing and maintaining the load-engaging device in longitudinally aligned relationship to the frame of the truck and means acting upon the cam mechanism through said connecting means for normally maintaining such alignment.

6. In an industrial truck, the combination of a truck frame, dirigible wheels for supporting the frame, a load elevator mechanism mounted upon the frame, load-engaging means carried by the load elevator mechanism in overhanging relation to the frame of the truck, a pivotal connecting means joining the load-engaging device to the elevator mechanism and adapted to permit a relative lateral swinging movement between the elevator mechanism and the load-engaging device, a cam mechanism associated with the connecting means for returning the load-engaging device along its lateral path of swing and normally maintaining the load-engaging device in longitudinally aligned relationship to the frame of the truck and means acting upon the pivotal connecting means for causing the cam mechanism to normally maintain such alignment.

7. In an industrial truck, an elevator mechanism, an attaching means for a load-engaging device comprising a pivotal mounting for the device whereby the device may swing laterally relative to the truck and said attaching means being adapted to cooperative association with the elevator mechanism on the truck and having a vertically extending trunnion detachably mounted in spaced-apart bearing sections carried by the elevator mechanism, one of the bearing sections having a vertically active plunger mechanism reacting upon an upper portion of the trunnion and the other bearing section having a cam associated therewith and acting upon the lower portion of the trunnion whereby the plunger and cam serve to automatically urge the load-engaging device into longitudinal alignment with the truck frame.

8. In an industrial truck, the combination of a main frame, an upright guide frame arranged upon the main frame, an elevator mechanism mounted to reciprocate upon the upright frame, a load-engaging device adapted to be brought into engagement with a load by a forward movement of the truck, and means connecting the load-engaging device to the elevator mechanism in an articulated manner thereby to permit relative lateral angular movement between the load-engaging device and the truck frame and a vertically angular movement between the load-engaging device and the elevator mechanism.

9. In an industrial truck, the combination of a main frame, an upright guide frame arranged upon the main frame, an elevator mechanism mounted to reciprocate upon the upright frame, a load-engaging device adapted to be brought into engagement with a load by a forward movement of the truck, and pivotal means connecting the load-engaging device to the elevator mechanism to permit lateral angular movement between the load-engaging device and the truck frame and a vertically angular movement between the load-engaging device and the elevator mechanism, and means for normally and resiliently maintaining the load-engaging device in a longitudinally aligned relationship to the truck frame.

10. A load handling mechanism for an industrial truck, comprising in combination an elevator mechanism adaptable for use on the frame of the truck, a load-engaging device adapted to be brought into a supporting and lifting relation to a load by a maneuvering movement of the truck, a double pivotal means connecting the load-engaging device to the elevator mechanism to permit both a lateral and vertical angular movement of the load-engaging device relative to the elevator mechanism, and means reacting between the elevator mechanism and the lifting device and acting upon said pivotal means for maintaining the lifting device in a normally centered relationship to the elevator mechanism.

11. A load handling mechanism for an industrial truck, comprising in combination an elevator mechanism adaptable for use on the frame of the truck, a load-engaging device adapted to be brought into a supporting and lifting relation to a load by a maneuvering movement of the truck, pivotal means connecting the load-engaging device to the elevator mechanism to permit both horizontal and vertical swinging of the load-engaging device, and means other than gravity acting upon the pivotal means for maintaining the lifting device in a normal relationship to the elevator mechanism.

12. In an industrial truck, a load elevating mechanism comprising a substantially vertically extending plate, a load engaging device comprising a portion extending at an angle to the plate and a portion extending substantially parallel with the plate, means supporting said load engaging device forwardly of said plate and permitting limited rotation of said device about said supporting means, and cam means so constructed and arranged that the weight of said device normally urges said first-named portion of said device into a position at right angles to the plane of said plate, said first-named portion of said device being freely rotatable about said supporting means at any and all points within its vertical range of movement.

13. In an industrial truck, a load elevating mechanism comprising a substantially vertically extending plate, a load engaging device comprising a portion extending at an angle to the plate and a portion extending substantially parallel with the plate, means supporting said load engaging device for pivotal movement relative to said plate, and cam means between said supporting means and said load engaging device for normally positioning said angularly extending portion of said device normal to said plate, said cam means being effective at any and all points within the vertical range of movement of said load engaging device.

14. In an industrial truck, a load elevating mechanism comprising a substantially vertically extending plate, a load engaging device having a portion extending at an angle to the plate, means supporting said load engaging device forwardly of said plate and permitting limited rotation of said device about said supporting means, and cam means so constructed and arranged that the weight of said device normally urges said portion of said device into a position at right angles to the plane of said plate, said portion of said load engaging device being freely rotatable about said supporting means at any and all points within its vertical range of movement.

15. In an industrial truck, a load elevating mechanism comprising a substantially vertically extending plate, a load engaging device having a portion extending at an angle to the plate, means supporting said load engaging device for pivotal movement relatively to said plate, and cam means between said supporting means and said load engaging device for normally positioning said angularly extending portion of said device normal to said plate, said cam means being effective at any and all points within the vertical range of movement of said load engaging device.

CLYDE E. COCHRAN.